(12) United States Patent
Henry (10) Patent No.: US 7,828,363 B1
(45) Date of Patent: Nov. 9, 2010

(54) REMOVABLE PROTECTIVE COVER FOR VEHICLE BODY PANELS FOR USE DURING OFF-ROAD TRAVEL

(76) Inventor: Maurice Michael Henry, P.O. Box 960054, Miami, FL (US) 33296-0054

( * ) Notice: Subject to any disclaimer, the term of this patent is extended or adjusted under 35 U.S.C. 154(b) by 0 days.

(21) Appl. No.: 12/390,561

(22) Filed: Feb. 23, 2009

(51) Int. Cl.
   *B62D 25/06* (2006.01)
(52) U.S. Cl. .............................. 296/136.08; 296/136.07
(58) Field of Classification Search ............ 296/136.07, 296/136.08
   See application file for complete search history.

(56) References Cited

U.S. PATENT DOCUMENTS

| | | | |
|---|---|---|---|
| 4,589,459 A | 5/1986 | Lantrip | |
| 4,635,996 A | 1/1987 | Hirose | |
| 5,158,324 A | 10/1992 | Flesher | |
| 5,549,938 A * | 8/1996 | Nesbitt | 428/17 |
| 6,017,079 A * | 1/2000 | Warner | 296/136.07 |
| 2002/0038962 A1* | 4/2002 | Perez | 296/136 |
| 2010/0007169 A1* | 1/2010 | Nguyen | 296/136.07 |

* cited by examiner

*Primary Examiner*—Joseph D Pape
(74) *Attorney, Agent, or Firm*—Albert Bordas, P.A.

(57) ABSTRACT

A removable protective cover for a vehicle, comprising a plurality of separate flexible magnetic sheets. Each is specifically cut to fit over a particular magnetic body panel of a particular make and model of vehicle. The plurality of separate flexible magnetic sheets is constructed of flexible magnetically impregnated materials incorporating a flexible waterproof outer coating and a flexible solid magnetic base. The plurality of separate flexible magnetic sheets are designed in a manner that when more than one magnetic sheet is needed to cover a single body panel, they are shaped to fit in an overlapping manner whereby a first magnetic sheet is positioned closest to a front of the vehicle and overlaps a second magnetic sheet adjoining it rearward thereof.

9 Claims, 7 Drawing Sheets

REMOVABLE PROTECTIVE COVER FOR VEHICLE BODY PANELS FOR USE DURING OFF-ROAD TRAVEL

BACKGROUND OF THE INVENTION

1. Field of the Invention

The present invention relates to removable protective covers for vehicle body panels for use during off-road travel, and more particularly, to the protection of a motor vehicle's painted metal body panels from hazards commonly encountered while traveling off-road. More specifically, the invention relates to a set of flexible magnetic sheets cut specifically for any particular make and model of vehicle, removably held in place by a force of magnetic attraction inherent throughout the flexible magnetic sheets and additionally secured by adhesive water resistant tape.

2. Description of the Related Art

It is a well known fact that road hazards such as flying debris, stones and insects encountered while driving a motor vehicle on the roadway damage a vehicle's paint, causing a less desirable appearance and loss of value. While a vehicle is traveling on a paved road typical damage comes from insects, small stones or pieces of debris made airborne by tires of vehicles traveling in front of said vehicle. The damaging objects are struck by the forward moving vehicle causing damage to the front of the vehicle, and because the objects are not attached to anything, they bounce off and away from the vehicle after impact. One product addresses this issue, most notably a vehicle front-end protector commonly known as a "bra". Because the aforementioned product protects only a front of the vehicle, it does not offer sufficient protection for a vehicle traveling off-road.

Some of the most common hazards a vehicle traveling in an off-road environment encounters are very large quantities of dirt, stones, mud, and water made airborne by the vehicle's own tires, as well as tall grass bushes and tree branches that that come in contact with the vehicle as it pushes through the brush. Unlike loose debris encountered on paved roads, the branches encountered off-road are typically attached to trees and do not bounce off the front of the vehicle on impact. Branches, often dead, sharp and without leaves, scrape along the entire length of the vehicle as it passes by. This causes deep long scratches in the vehicle's paint, commonly called "pin stripes" by those who often travel off-road in their vehicles.

Some efforts heretofore proposed to protect more than the front of a vehicle's body panels from damage are as follows:

U.S. Pat. No. 4,589,459 issued to Lantrip on May 20, 1986 for Vehicle protective cover. However, it differs from the present invention because Lantrip teaches protective covers for use on vehicles, which uses an array of clips, belts, and fasteners to attach and adjust a cover. The use of multiple attachment devices adds to the cost of the cover and adds to the installation time the user must dedicate to attach and remove the cover.

U.S. Pat. No. 4,635,996 issued to Hirose on Jan. 13, 1987 for Vehicle body cover. However, it differs from the present invention because Hirose teaches a vehicle body cover being formed of a cover sheet which is waterproof and weatherproof that uses adhesive, metal hook buttons or fasteners to attach the cover in multiple locations but not completely to the vehicle. The aforementioned cover and any similar, that incorporate a flexible material that is attached in multiple locations but not completely attached to the vehicle are not preferable for off-road use. This is because the majority of the inside (side making contact with the vehicle paint) area of the cover intermittently comes in contact with the vehicle body panel in such a way that large amounts of dirt, rocks, and debris made airborne by the vehicle tires can get between the protective cover and the vehicle's painted body panel. Once said dirt and debris get between the protective cover and the vehicle body panel, the intermittent movement of the cover against the vehicle panel by the force of wind and contact with brush can cause the very scratches to the vehicle body panel the cover is supposed to prevent.

Hirose also teaches a removable vehicle body cover being formed of a covering sheet which is waterproof and weatherproof that uses adhesive to attach the cover completely to the vehicle by applying an unspecified adhesive on the overall surface of the automobile. Applying adhesive to the entire contact surface and waiting for it to cure before use, and then cleaning said adhesive from the entire contact surface of the vehicle and the entire contact surface of the cover after use is a lengthy process that few consumers will be willing to do every time they operate their vehicle off-road.

U.S. Pat. No. 5,158,324 issued to Flesher on Oct. 27, 1992 for Protective cover for vehicles. However, it differs from the present invention because Flesher teaches a protective cover for vehicles wherein a flexible material, having a magnetic base, is cut in segments to provide a protective cover for a vehicle. While the aforementioned invention may be sufficient for paved roads, it will not effectively protect a vehicle against the aforementioned typical off-road hazards because Flesher teaches that the various segments of the protective cover are placed adjacent to each other in a side-by-side relation. When segments are placed in a side by side by side-by-side relation, there exists a small gap where the edges of the two segments meet. A branch traveling across this gap with moderate force can catch the edge of the segment and peel it off the vehicle, allowing the vehicle's exposed painted metal body panel to be damaged, thus affecting the loss of the protective cover segment. Even when the panel is not peeled off, branches dragging across the gap will come into contact with the edge of the magnetic sheet where the plastic covering is bonded to the magnetic base. This constant scraping, as the vehicle moves through the brush, will eventually cause the plastic covering to separate from the magnetic base, thereby damaging the protective cover panel.

Flesher also teaches that a plurality of spaced grooves is provided across the magnetic base portion of each segment so that moisture may pass beneath the flexible material. Providing spaced grooves across the magnetic base portion of each segment allows for substantially less magnetic material incorporated into each panel, greatly reducing it's magnetic strength to the vehicle's painted metal body panel.

Flesher also teaches that the segments of the protective cover are secured by the magnetic attraction of the magnetic base portion to the magnetically attractive body portion of the vehicle. A vehicle traveling in an off-road environment frequently travels through standing water, causing a stream of water to be forced outward in all directions from the area where the tire makes contact with the ground. Testing has revealed that this stream of water often makes contact with the edge of the protective cover with force great enough to overpower the force of magnetic attraction inherent in the protective cover, causing it to be unintentionally removed from the vehicle and exposing the vehicle's painted body panel to possible damage and effecting the loss and/or damage of the protective cover sheet.

Flesher also teaches that only the segments of the protective cover are secured by the magnetic attraction of the magnetic base portion to the magnetically attractive body portion of the vehicle. A vehicle traveling in an off-road environment frequently encounters branches that typically first make contact at the front of the vehicle and then scrape along the vehicle side until it passes. Testing has revealed that as branches scrape along the side of the vehicle, they come in contact with leading edges (closest to the front of the vehicle) of protective cover sheets with force great enough to overpower the force of magnetic attraction inherent in the protective cover, causing it to be unintentionally removed from the vehicle and exposing the vehicle's painted body panel to possible damage and effecting the loss and/or damage of the protective cover sheet.

Other patents describing the closest subject matter provide for a number of more or less complicated features that fail to solve the problem in an efficient and economical way. None of these patents suggest the novel features of the present invention.

SUMMARY OF THE INVENTION

The instant invention teaches a set of flexible magnetic sheets designed in a manner that when more than one magnetic sheet is needed to cover a single steel vehicle panel, the magnetic sheets are cut to fit in an overlapping position (like scales on a fish), where the magnetic sheet closest to the front of the vehicle overlaps the sheet adjoining it to the rear (towards the rear of the vehicle). An overlapping position leaves no gap between the protective cover sheets and extreme dragging force by an object can be applied without peeling off or damaging the magnetic sheets or the vehicle's painted body panel underneath. Additionally, the present invention provides for the use of water resistant tape to additionally secure the cover to the vehicle.

The present invention further teaches a set of flexible magnetic sheets used for a protective cover, incorporating a solid flexible magnetic base. Thereby allowing for a maximum amount of magnetic base in contact with the vehicle's painted metal body panel and allowing for a maximum amount of magnetically attractive strength. The present invention further teaches that the cover is designed in a manner as to leave a portion of the vehicle's painted surface exposed to facilitate an attachment device, such as water resistant tape, to removably and securely affix certain portions of the cover to the vehicle. Thus preventing a stream of water from being forced between the protective cover sheet and the painted vehicle body panel. The present invention further teaches that the cover is designed in a manner as to leave a portion of the vehicle's painted surface exposed to facilitate an attachment device such as water resistant tape to removably and securely affix certain portions of the cover to the vehicle thus preventing branches from having the ability to remove the protective cover sheets.

More specifically, the present invention is removable protective cover for a vehicle, comprising a plurality of separate flexible magnetic sheets. Each is specifically cut to fit over a particular magnetic body panel of a particular make and model of vehicle. The plurality of separate flexible magnetic sheets is constructed of flexible magnetically impregnated materials incorporating a flexible waterproof outer coating and a flexible solid magnetic base. The plurality of separate flexible magnetic sheets are designed in a manner that when more than one magnetic sheet is needed to cover a single body panel, they are shaped to fit in an overlapping manner whereby a first magnetic sheet is positioned closest to a front of the vehicle and overlaps a second magnetic sheet adjoining it rearward thereof.

The plurality of separate flexible magnetic sheets are designed in a manner that when more than one magnetic sheet share a similar simple shape, each magnetic sheet comprises a distinctive cut at one corner at a same relative location to identify an orientation of the magnetic sheet and the particular magnetic body panel they cover. The plurality of separate flexible magnetic sheets is designed to leave a predetermined area of painted surface exposed from the vehicle to facilitate an attachment device to further secure the plurality of separate flexible magnetic sheets onto the vehicle. The attachment device can be water resistant tape. In addition, the plurality of separate flexible magnetic sheets may comprise holes to accommodate components of the vehicle, which can be a motor vehicle.

It is therefore an object of this invention to provide an economical, easy to use and maintain, removable and reusable protective cover for vehicles, wherein the cover protects the majority of the side portions of the vehicle's painted metal body panels, wherein the cover has the ability to endure contact with common hazards encountered by a vehicle traveling off-road while protecting said vehicle's painted metal body panels from said hazards.

It is a further object of this invention to provide a protective cover that is attached to the vehicle's painted metal body panels by a force of magnetic attraction, inherent in the material from which the cover is constructed.

It is a further object of this invention to provide a protective cover that provides for the ability to use water resistant tape on specific parts of the cover to additionally secure said cover to the vehicle.

It is a further object of this invention to provide a protective cover that will not flap against the vehicle's painted metal body panels due to the force of wind caused by the vehicle's forward motion.

It is a further object of this invention to provide a protective cover with aerodynamic properties such that all pieces of the cover can remain properly attached to a vehicle traveling.

It is a further object of this invention to provide a protective cover wherein dirt and debris cannot get between the protective cover and the vehicle's painted metal body panels in such a way that it can cause damage to vehicle's painted metal body panels.

It is a further object of this invention to provide a protective cover that can be attached to a vehicle in approximately 15 minutes and also be cleaned, removed, and packaged for storage in approximately 15 minutes.

It is a further object of this invention to provide a protective cover that is compact and takes up minimal storage space.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Referring now to the drawings, the present invention is generally referred to with numeral 40.

Figure 1:
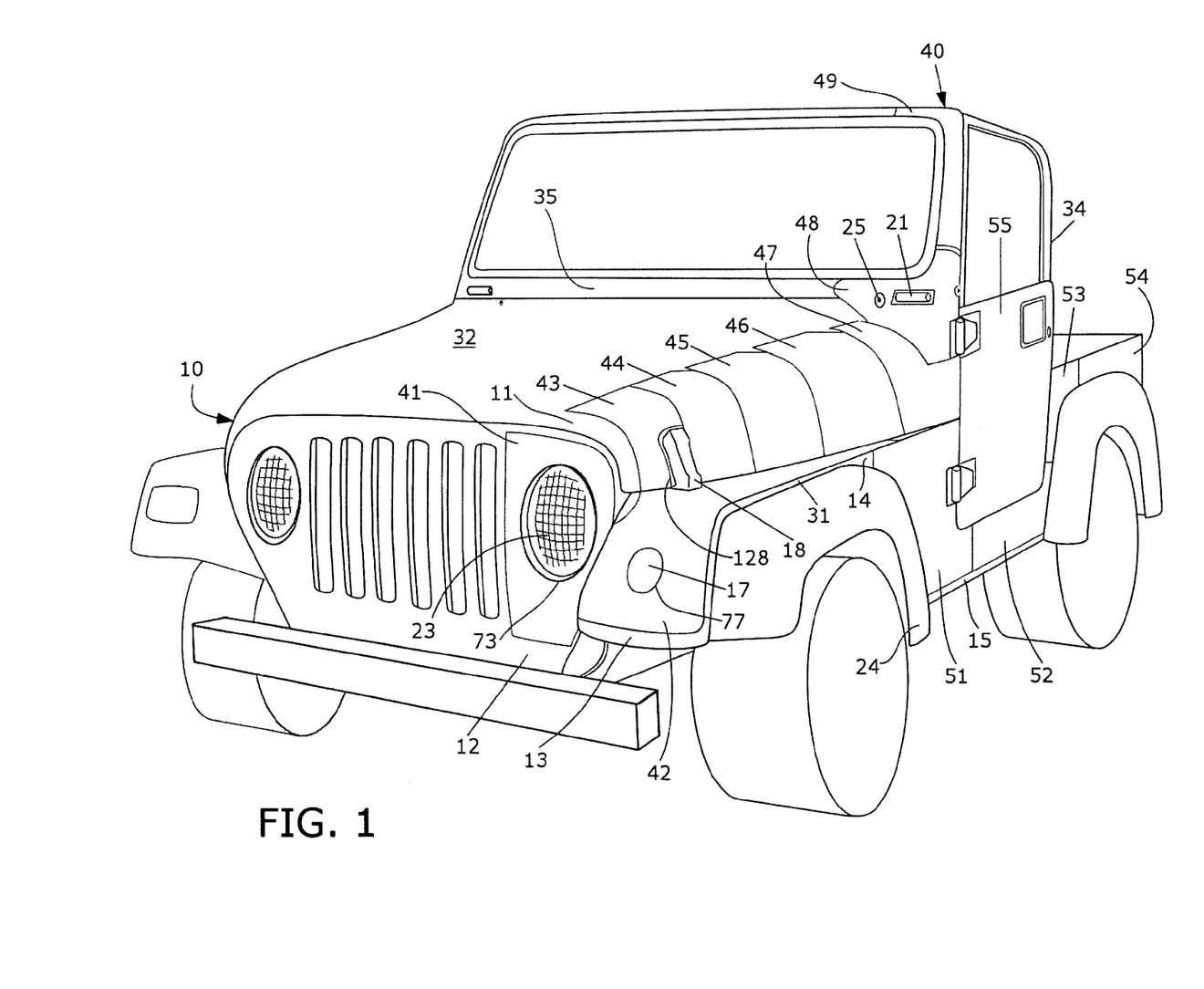
FIG. 1 is a perspective view of a sport utility vehicle showing a typical embodiment of the protective cover of the present invention installed upon a left side of the vehicle.
Figure 2:
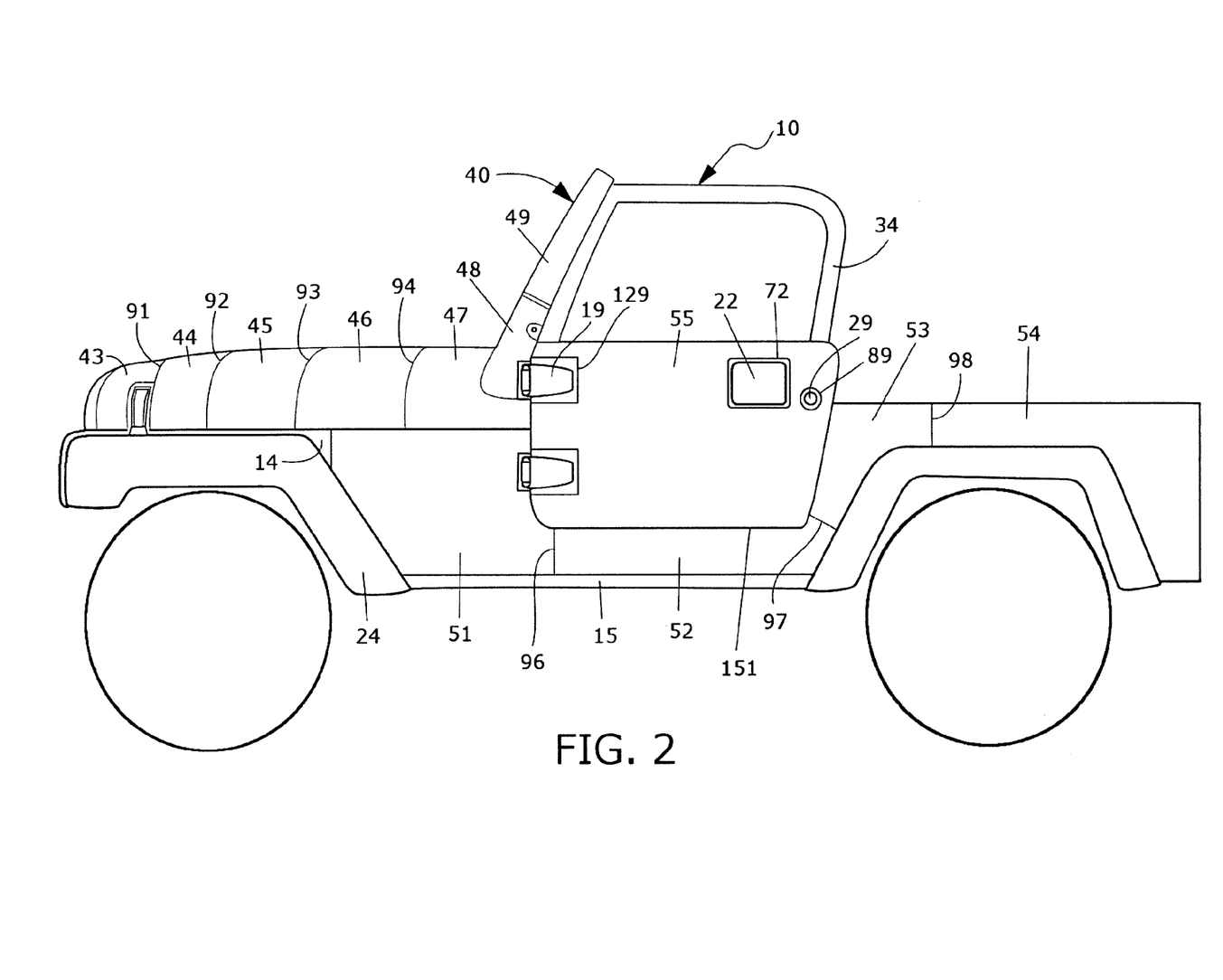
FIG. 2 is a left side elevation view of a sport utility vehicle showing a typical embodiment of the protective cover of the present invention installed thereupon.

As seen in FIGS. 1 and 2, there is shown a vehicle 10 with a typical embodiment of protective cover 40 of the present invention installed thereupon. Protective cover 40 is a removable protective cover for a vehicle, such as a motor vehicle. Vehicle 10 can be a sport utility vehicle as seen. For illustrative purposes, protective cover 40 is shown installed only upon a left side of vehicle 10 (from a perspective of a driver sitting in vehicle 10).

It is to be understood for each protective cover sheets 41; 42; 43; 44; 45; 46; 47; 48; 49; 51; 52; 53; 54; and 55 of protective cover 40 shown, there exists an additional mirror image piece to cover an opposite side of vehicle 10. Protective cover 40 is comprised of separate protective cover sheets 41; 42; 43; 44; 45; 46; 47; 48; 49; 51; 52; 53; 54; and 55. Protective cover sheets 41; 42; 43; 44; 45; 46; 47; 48; 49; 51; 52; 53; 54; and 55 are attached to vehicle 10 by means of magnetic attraction inherent in them, which takes effect the moment a user places a protective cover sheet on a vehicle 10 body panel. Therefore, protective cover sheets 41; 42; 43; 44; 45; 46; 47; 48; 49; 51; 52; 53; 54; and 55 define a plurality of separate flexible magnetic sheets. In the preferred embodiment, the body panel is made of a magnetic material, such as steel or other material having magnetic characteristics. Each protective cover sheet is specifically cut to conform to a particular magnetic body panel of a particular make and model of vehicle 10 that it is designed to protect.

Protective cover sheet 41 covers a front area of vehicle 10, surrounding headlight 23. Protective cover sheet 42 covers a top of a fender panel 31. Protective cover sheets 43; 44; 45; 46; and 47 cover a left side of hood 32. Protective cover sheets 41; 42; 43; 44; 45; 46; 47; 48; 49; 51; 52; 53; 54; and 55 are rigid to conform to areas of vehicle 10 that curve on multiple planes such as hood 32. Protective cover sheets 43; 44; 45; 46; and 47 cover a large curved area of hood 32. Protective cover sheets 43; 44; 45; 46; and 47 are mounted adjacent to each other in an overlapping fashion to maximize coverage and protection of hood 32. Protective cover sheet 48 covers a lower part of windshield frame 35, while protective cover sheet 49 covers an upper portion of said windshield frame 35. Protective cover sheets 51; 52; 53 and 54 cover a left side of vehicle 10 in a same overlapping fashion as protective cover sheets 43; 44; 45; 46; and 47 cover hood 32. Typically, sides of vehicle 10 are not curved on multiple planes. However, protective cover sheets 51; 52; 53 and 54 are used because a single large sheet would be difficult to mount onto vehicle 10. Protective cover sheet 55 covers a section of door 34.

In order for protective cover 40 to conform to features of vehicle 10, it may comprise holes. As an example, protective cover sheet 41 comprises hole 73 to allow visibility for headlight 23, and protective cover sheet 42 comprises hole 77 to allow for visibility of turn signal 17. Holes can also be provided to allow for protruding vehicle 10 parts such as in protective cover sheet 48, where a hole is provided for an exposed screw 25 and windshield hinge 21. Holes 72 and 89 allow access to door handle 22 and keyhole 29. If providing a hole in a sheet of protective cover 40 is not practical, a protective cover sheet can be designed to follow around a protruding vehicle 10 part such as protective cover sheet 43, which comprises cut 128 around hood hinge 18, and protective cover sheet 55, which comprises cut 129 around a raised door hinge 19.

As seen in FIG. 2, when more than one protective cover sheet is required to cover a single vehicle 10 panel, the protective cover sheets are cut to fit in an overlapping position, like scales on a fish, where the protective cover sheet closest to a front of vehicle 10 overlaps the protective cover sheet adjoining it to a rear and towards a rear of vehicle 10. Therefore, protective cover sheet 47 is overlapped by protective cover sheet 46 at their junction 94, protective cover sheet 46 is overlapped by protective cover sheet 45 at their junction 93, protective cover sheet 45 is overlapped by protective cover sheet 44 at their junction 92, protective cover sheet 44 is overlapped by protective cover sheet 43 at their junction 91, protective cover sheet 54 is overlapped by protective cover sheet 53 at their junction 98, protective cover sheet 53 is overlapped by protective cover sheet 52 at their junction 97, and protective cover sheet 52 is overlapped by protective cover sheet 51 at their junction 96. The of magnetic attraction strength inherent in protective cover 40 is greatly reduced in areas where one protective cover sheet overlaps another, therefore the overlapping sections at any junction of any two protective cover sheets is two inches or less in a preferred embodiment. In seam 151, where a movable body panel such as door 34 meets another body panel 15, the protective cover sheets 55 and 52 do not overlap.

Figure 3:
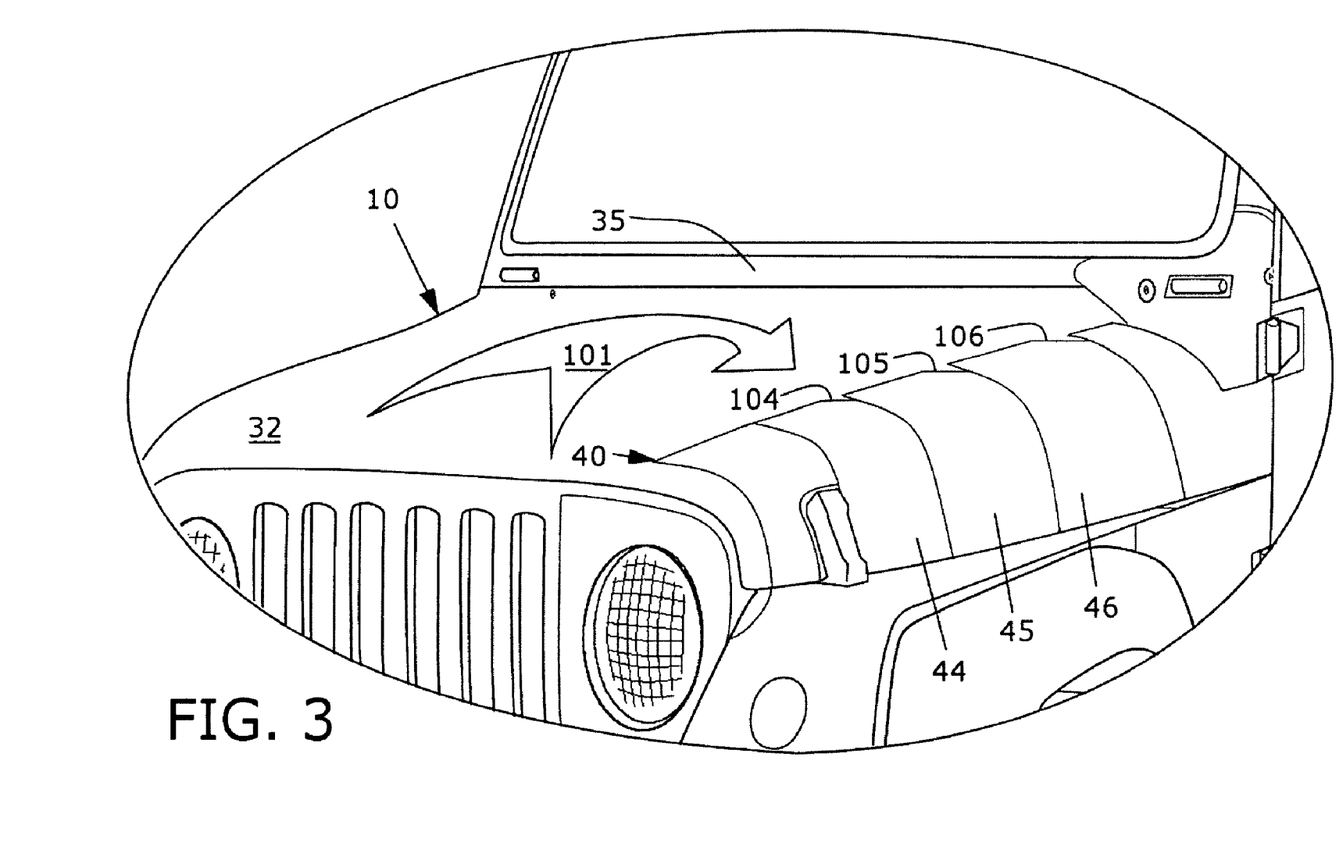
FIG. 3 is a partial view of FIG. 1 showing in detail the diagonally cut corners of certain protective cover sheets for identification and aerodynamic purposes.

FIG. 3 is a partial view of FIG. 1 and illustrates a feature applied when protective cover sheets 44; 45; and 46 share a similar simple shape. As illustrated, they are cut so that corners 104; 105; and 106 identify an orientation of the protective cover sheets 44; 45; and 46 to each other and the specific vehicle body panel, such as hood 32, they cover. Without the distinctively cut corners 104; 105; and 106, protective cover sheets 44; 45; and 46 are relatively nondescript, having a simple rectangle shape and a user could be uncertain as to how they are to be placed on hood 32. With simple instructions indicating that corners 104; 105; and 106 are all to be towards a top and rear of vehicle 10, a proper orientation is quickly determined. The above-described feature is also illustrated in FIG. 6.

The abovementioned corners 104; 105; and 106 are diagonally cut as a necessary aerodynamic feature of protective cover 40, because wind current 101, traveling across a horizontal plane of hood 32, is redirected to an outside of vehicle 10 when it makes contact with a vertical plane of windshield frame 35. At speeds over 40 miles per hour, a force of wind current 101 is such that without corner 106 on protective cover sheet 46, wind current 101 overpowers the force of magnetic attraction inherent in protective cover sheet 46 causing it to be blown off vehicle 10.

Figure 4:
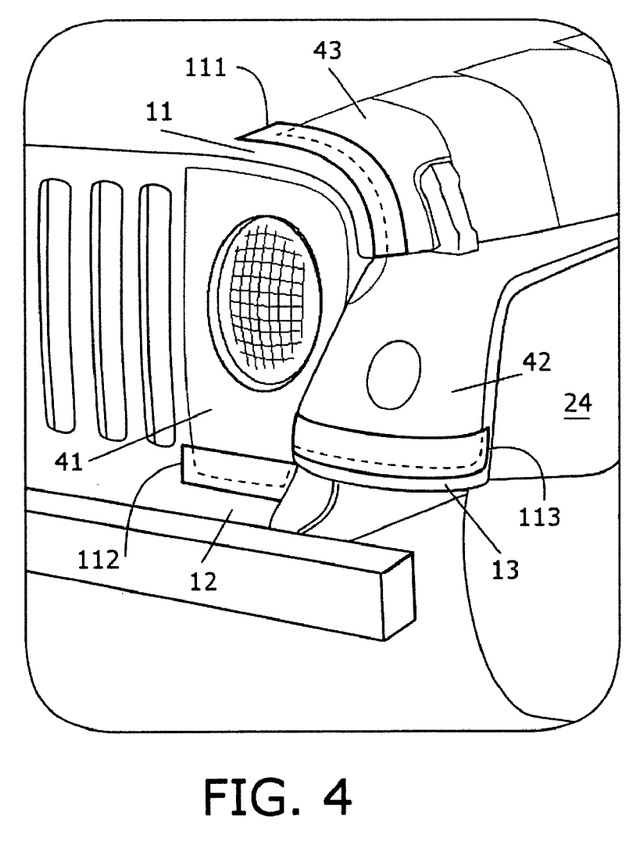
FIG. 4 is a partial view of FIG. 1, showing the use of water resistant tape to secure certain protective cover sheets to the vehicle.
Figure 5:
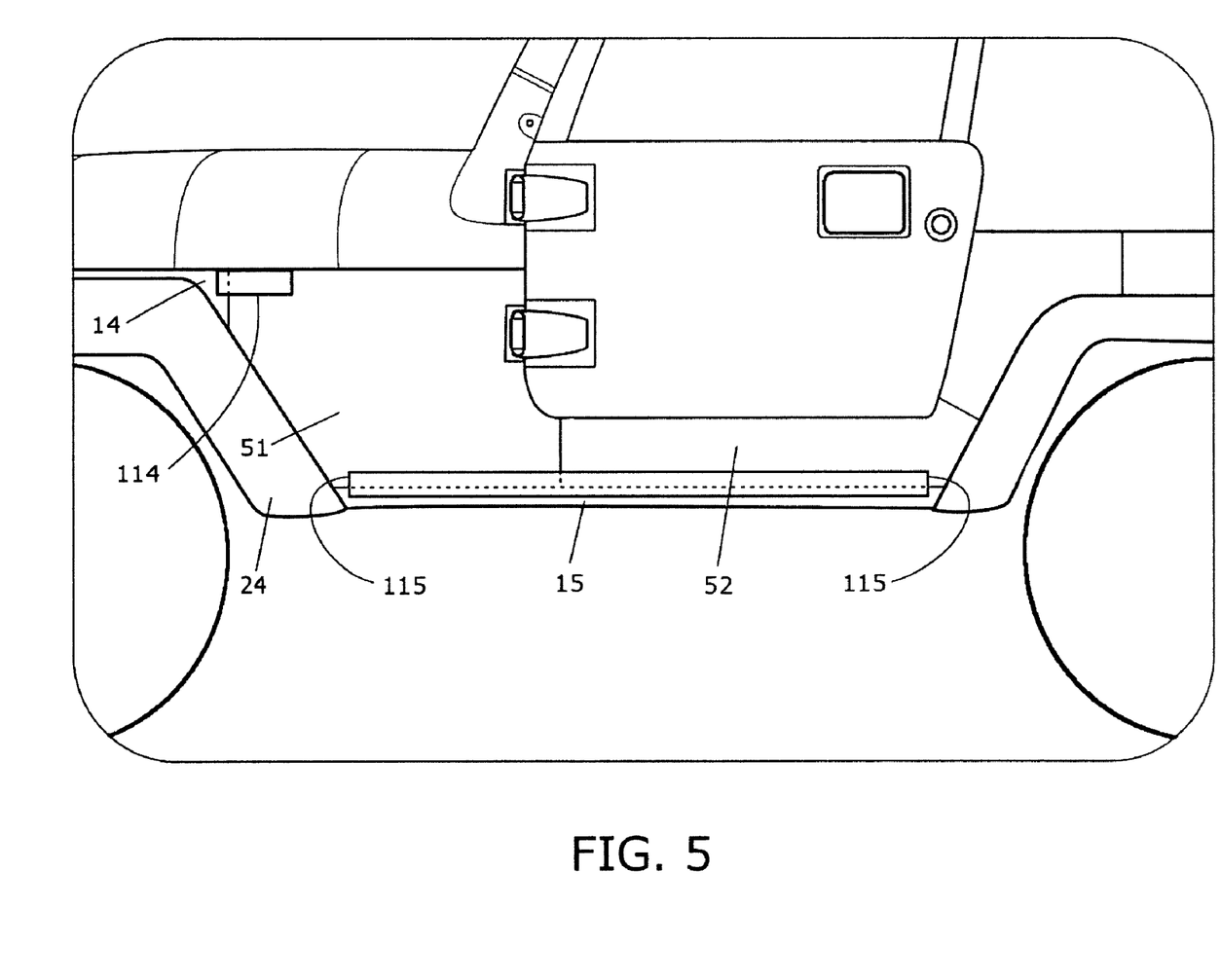
FIG. 5 is partial view of FIG. 2, showing the use of water resistant tape to secure certain protective cover sheets to the vehicle.

As seen in FIGS. 4 and 5, certain protective cover sheets 41; 42; 43; 51; and 52 are designed such that vehicle's 10 painted surface sections 11; 12; 13; and 14 are left exposed. This facilitates the installation of an attachment device such as water resistant tape. As seen in these illustrations, plastic vehicle fender flares 24 are not covered by instant invention 40. Specifically, certain protective cover sheets are designed in a manner as to leave a portion of vehicle's 10 painted surfaces exposed to facilitate the attachment of water resistant tape. Protective cover sheet 43 leaves painted surface section 11 exposed for the attachment of water resistant tape 111. Protective cover sheet 41 leaves painted surface section 12 exposed for the attachment of water resistant tape 112. Therefore, protective cover sheet 42 leaves painted surface section 13 exposed for the attachment of water resistant tape 113. As best seen in FIG. 5, protective cover sheet 51 leaves painted surface section 14 exposed for the attachment of water resistant tape 114, and protective cover sheets 51 and 52 leave body panel 15 exposed for the attachment of water resistant tape 115.

Figure 6:
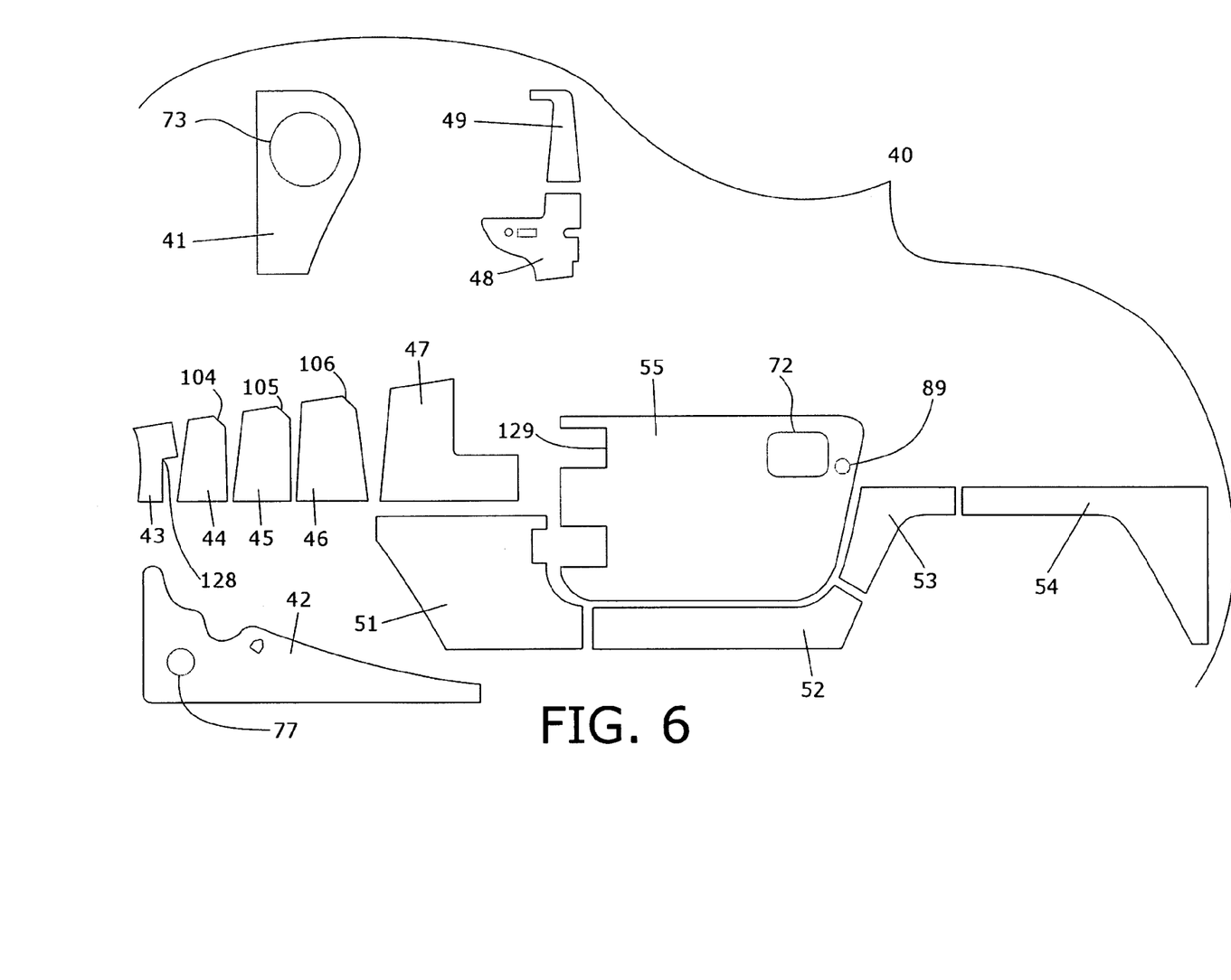
FIG. 6 shows the present invention on a flat plane.

As seen in FIG. 6, some protective cover sheets are not curved in shape to conform to the shape of vehicle 10. Those protective cover sheets are laid out separately on a flat plane so the features previously discussed can easily be recognized.

Figure 7:
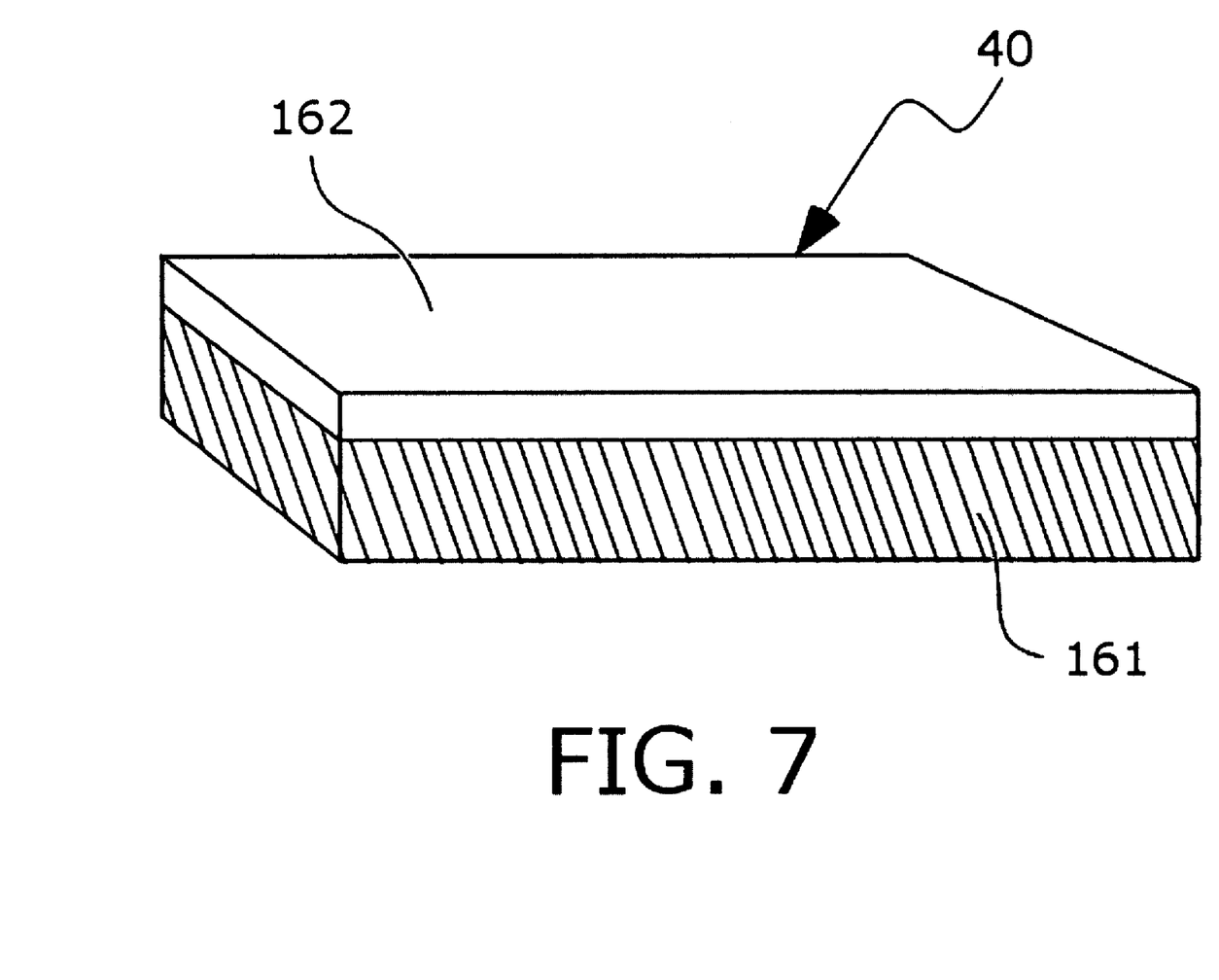
FIG. 7 is a cross sectional view of a piece of the preferred protective cover sheet.

As seen in FIG. 7, protective cover 40 is constructed of flexible magnetically impregnated materials incorporating a flexible waterproof outer coating 162 and a flexible solid magnetic base 161.

The foregoing description conveys the best understanding of the objectives and advantages of the present invention. Different embodiments may be made of the inventive concept of this invention to adapt to different vehicles. It is to be understood that all matter disclosed herein is to be interpreted merely as illustrative, and not in a limiting sense.

What is claimed is:

1. A removable protective cover for a vehicle, comprising a plurality of separate flexible magnetic sheets, each specifically cut to fit over a particular body panel of a particular make and model of vehicle, said plurality of separate flexible magnetic sheets are constructed of flexible magnetically impregnated materials incorporating a flexible waterproof outer coating and a flexible solid magnetic base, at least one of said plurality of separate flexible magnetic sheets is diagonally cut as an aerodynamic feature to redirect wind current from said vehicle, said plurality of separate flexible magnetic sheets are shaped to fit in an overlapping manner whereby a first of said plurality of separate flexible magnetic sheets is positioned closest to a front of said vehicle and overlaps a second of said plurality of separate flexible magnetic sheets adjoining it rearward thereof.

2. The removable protective cover for a vehicle set forth in claim 1, further characterized in that said overlapping manner at any junction of said plurality of separate flexible magnetic sheets is two inches or less.

3. The removable protective cover for a vehicle set forth in claim 1, further characterized in that some of said plurality of separate flexible magnetic sheets comprise a distinctive cut at one corner at a same relative location to identify an orientation of said plurality of separate flexible magnetic sheets and said particular magnetic body panel they cover.

4. The removable protective cover for a vehicle set forth in claim 1, further characterized in that said plurality of separate flexible magnetic sheets are designed to leave a predetermined area of painted surface exposed from said vehicle for water resistant tape to adhere thereon to further secure said plurality of separate flexible magnetic sheets onto said vehicle.

5. The removable protective cover for a vehicle set forth in claim 1, further characterized in that said plurality of separate flexible magnetic sheets may comprise holes to accommodate components of said vehicle.

6. The removable protective cover for a vehicle set forth in claim 5, further characterized in that said vehicle is a motor vehicle.

7. A removable protective cover for a vehicle, comprising a plurality of separate flexible magnetic sheets, each specifically cut to fit over a particular body panel of a particular make and model of vehicle, said plurality of separate flexible magnetic sheets are constructed of flexible magnetically impregnated materials incorporating a flexible waterproof outer coating and a flexible solid magnetic base, at least one of said plurality of separate flexible magnetic sheets is diagonally cut as an aerodynamic feature to redirect wind current from said vehicle, said plurality of separate flexible magnetic sheets are shaped to fit in an overlapping manner whereby a first of said plurality of separate flexible magnetic sheets is positioned closest to a front of said vehicle and overlaps a second of said plurality of separate flexible magnetic sheets adjoining it rearward thereof, further characterized in that some of said plurality of separate flexible magnetic sheets comprise a distinctive cut at one corner at a same relative location to identify an orientation of said plurality of separate flexible magnetic sheets and said particular magnetic body panel they cover, said plurality of separate flexible magnetic sheets are designed to leave a predetermined area of painted surface exposed from said vehicle for water resistant tape to adhere thereon to further secure said plurality of separate flexible magnetic sheets onto said vehicle.

8. The removable protective cover for a vehicle set forth in claim 7, further characterized in that said plurality of separate flexible magnetic sheets may comprise holes to accommodate components of said vehicle.

9. The removable protective cover for a vehicle set forth in claim 8, further characterized in that said vehicle is a motor vehicle.

\* \* \* \* \*